United States Patent

Sato et al.

[11] Patent Number: 5,827,152
[45] Date of Patent: Oct. 27, 1998

[54] CONTROL SYSTEM FOR AUTOMTIC TRANSMISSION FOR VEHICLE

[75] Inventors: Yoichi Sato; Tatsuya Yamakita, both of Wako, Japan

[73] Assignee: Honda Giken Kogyo Kabushiki Kaisha, Tokyo, Japan

[21] Appl. No.: 970,538

[22] Filed: Nov. 14, 1997

Related U.S. Application Data

[63] Continuation of Ser. No. 515,639, Aug. 16, 1995, abandoned.

[30] Foreign Application Priority Data

Aug. 23, 1994 [JP] Japan .................................. 6-198136

[51] Int. Cl.⁶ .................................................. F16H 61/12
[52] U.S. Cl. ........................................... 477/132; 477/906
[58] Field of Search ..................... 477/131, 132, 477/138, 148, 154, 155, 162, 906, 86, 87, 176

[56] References Cited

U.S. PATENT DOCUMENTS

| | | | |
|---|---|---|---|
| 4,785,689 | 11/1988 | Iwatsuki et al. | 477/906 |
| 4,843,551 | 6/1989 | Milunas | 477/906 |
| 4,845,621 | 7/1989 | Kawata et al. | 477/154 |
| 4,958,538 | 9/1990 | Yamashita et al. | |
| 5,400,678 | 3/1995 | Jain et al. | 477/115 |

FOREIGN PATENT DOCUMENTS

| | | |
|---|---|---|
| 0 310 277A2 | 4/1989 | European Pat. Off. . |
| 0 353 771A2 | 2/1990 | European Pat. Off. . |
| 0 457 585A2 | 11/1991 | European Pat. Off. . |
| 4-300457 | 10/1992 | Japan . |

*Primary Examiner*—Rodney H. Bonck
*Assistant Examiner*—Sherry Lynn Estremsky
*Attorney, Agent, or Firm*—Nikaido, Marmelstein, Murray & Oram LLP

[57] ABSTRACT

A slip detecting device detects slipping of a selected hydraulically engaged element of an automatic transmission during non-shifting, and a determining device determines a hydraulically engaged element larger in driving-force transmitting capacity than the hydraulically engaged element which is in its engaged state. A transmission control element then brings the hydraulically engaged element having the larger driving force transmitting capacity, into its engaged state, in place of the hydraulically engaged element which was in its engaged state. Thus, the slipping of the hydraulically engaged element during non-shifting is prevented.

2 Claims, 4 Drawing Sheets

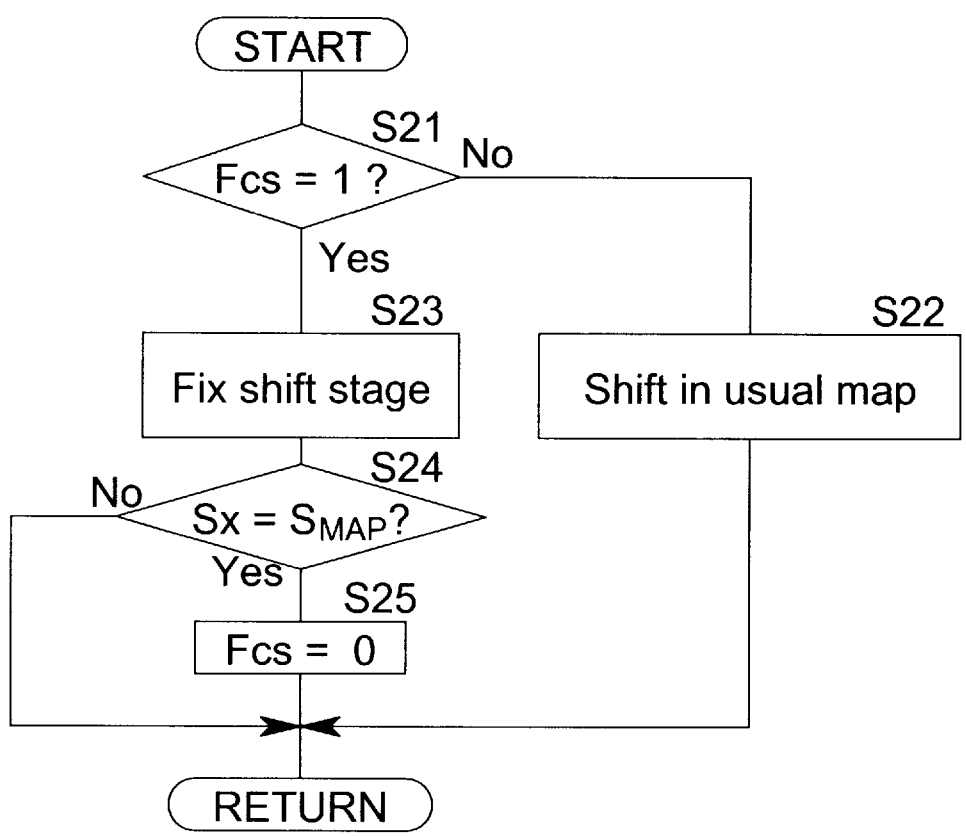

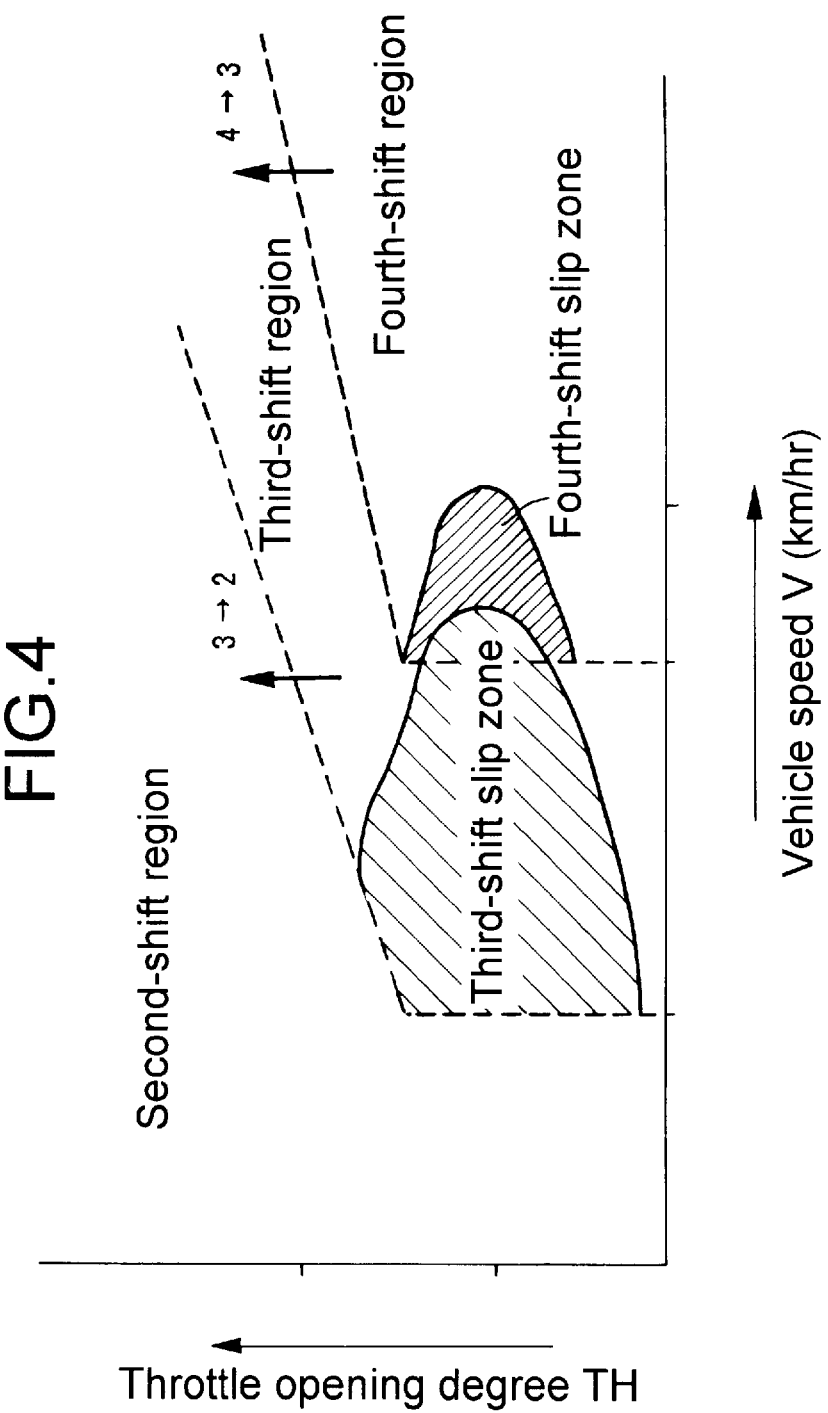

CONTROL SYSTEM FOR AUTOMTIC TRANSMISSION FOR VEHICLE

This application is a continuation of application Ser. No. 08/515,639, filed Aug. 16, 1995, now abandoned.

BACKGROUND OF THE INVENTION

1. Field of the Invention

The present invention relates to a control system for an automatic transmission for a vehicle, which performs a shifting by selectively bringing any of a plurality of hydraulically engaged elements into an engaged state, based upon the operational state of the vehicle.

2. Description of the Prior Art

The hydraulic pressure for bringing a hydraulic clutch or a hydraulic brake, in the automatic transmission of a vehicle, into its engaged state is set at the minimum pressure (i.e., at a skeleton pressure) so as to reduce shifting shock. However, there is a problem that is often the case in that the hydraulic pressure is not sufficient in a particular operational state of the vehicle and for this reason, the hydraulic clutch or the hydraulic brake slips, resulting in reduced durability.

A control system for an automatic transmission for a vehicle disclosed in Japanese Patent Application Laid-Open No. 300457/92, is designed such that when slipping of the hydraulic clutch or the hydraulic brake is detected, the hydraulic pressure supplied to the hydraulic clutch or the hydraulic brake is increased to inhibit the slipping.

However, there is a problem that if the hydraulic pressure is increased upon slipping of the hydraulically engaged elements as in the prior art, the hydraulic circuit is complicated, and shifting shock is increased, resulting in a degraded drive feeling.

SUMMARY OF THE INVENTION

The present invention has been accomplished with such circumstance in view, and it is an object of the present invention to reliably prevent the slipping of hydraulically engaged elements without increasing the hydraulic pressure.

To achieve the above object, according to the present invention, there is provided a control system for an automatic transmission for a vehicle, which performs shifting by selectively bringing any of a plurality of hydraulically engaged elements into an engaged state, based upon an operational state of the vehicle. The control system comprises a slip detecting means for detecting slipping of a selected hydraulically engaged element during non-shifting; a determining means for determining one of the hydraulically engaged elements which has a driving force transmitting capacity larger than the selected hydraulically engaged element; and a switching means for switching the selected hydraulically engaged element to the hydraulically engaged element determined by the determining means to thereby bring the determined hydraulically engaged element into its engaged state, when slipping is detected by the slip detecting means.

According to another feature of the present invention, the determining means determines one of the hydraulically engaged elements for establishing a shift stage lower than a shift stage established by the selected hydraulically engaged element.

According to a further feature of the present invention, when the hydraulically engaged element selected based on the operational state of the vehicle corresponds with the hydraulically engaged element determined by said determining means, the hydraulically engaged element selected based on the operational state of the vehicle, is brought into its engaged state, in place of the hydraulically engaged element determined by the determining means.

With the arrangement as set forth above, when the slip detecting means detects slipping generated in the hydraulically engaged element, with the hydraulically engaged element selected in its engaged state, a hydraulically engaged element larger in driving-force transmitting capacity and determined by the determining means, is brought into its engaged state by the switching means, in place of the hydraulic pressure element which is in its engaged state. This causes the slipping of the hydraulically engaged element to be prevented without increasing of the hydraulic pressure.

With the arrangement as set forth above, with the establishing of a lower shift stage, larger in driving-force transmitting capacity, it is possible to further reliably prevent the slipping.

With the arrangement as set forth above, when the hydraulically engaged element selected based upon the operational state of the vehicle, corresponds with the hydraulically engaged element determined by the determining means, the hydraulically engaged element selected based on the operational state of the vehicle, is maintained in its engaged state, until the slip detecting means detects the generation of slipping again. Thus, shift control conducted upon the generation of the slipping, can be smoothly switched to shift control conducted in a usual condition.

BRIEF DESCRIPTION OF THE DRAWINGS

FIG. 3 is a flow chart of a portion of the operation of the preferred embodiment.

FIG. 4 is a graph for explaining the operation.

DETAILED DESCRIPTION OF THE PREFERRED EMBODIMENT

Figure 1:
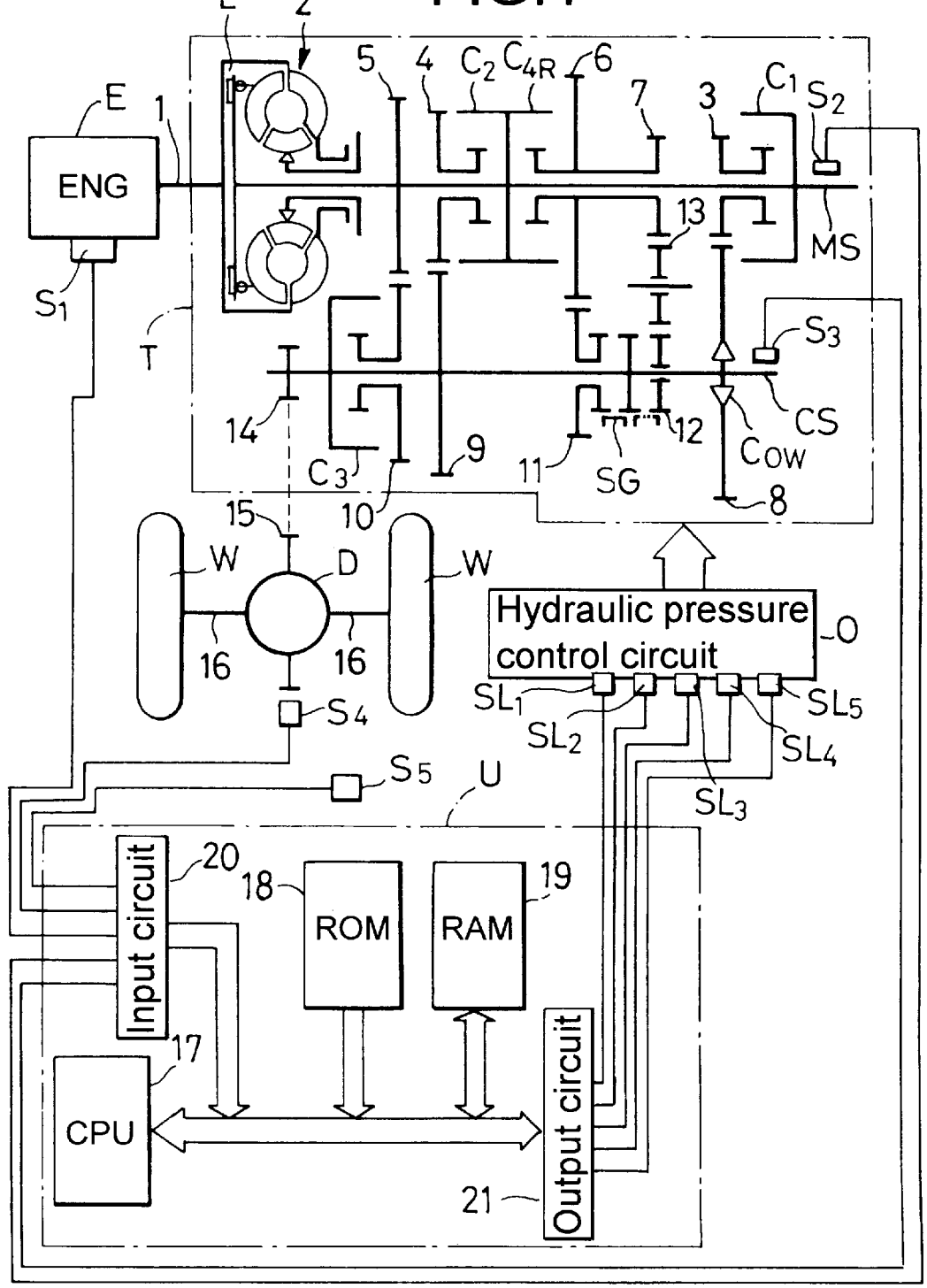
FIG. 1 is an illustration of the arrangement of an automatic transmission and a control unit therefor.

As shown in FIG. 1, the automatic transmission T for a vehicle includes a main shaft MS connected to a crankshaft 1 of an engine E through a torque converter 2 having a lock-up clutch L, and a counter shaft CS connected to the main shaft MS through a plurality of gear trains.

Carried on the main shaft MS are a main first-shift gear 3, a main second-shift gear 4, a main third-shift gear 5, a main fourth-shift gear 6 and a main reverse gear 7. Carried on the counter shaft CS are a counter first-shift gear 8 meshed with the main first-shift gear 3, a counter second-shift gear 9 meshed with the main second-shift gear 4, a counter third-shift gear 10 meshed with the main third-shift gear 5, a counter fourth-shift gear 11 meshed with the main fourth-shift gear 6 and a counter reverse gear 12 connected to the main reverse gear 7 through a reverse idle gear 13.

If the main first-shift gear 3 relatively rotatably carried on the main shaft MS is coupled to the main shaft MS by a first-shift clutch $C_1$, a first-shift stage is established. The first-shift clutch $C_1$ is maintained in an engaged state even during establishment of second to fourth shift stages and hence, the counter first-shift gear 8 is supported through a one-way clutch $C_{OW}$. If the main second-shift gear 4 relatively rotatably carried on the main shaft MS is coupled to the main shaft MS by a second-shift clutch $C_2$, a second-shift stage is established. If the counter third-shift gear 10 relatively rotatably carried on the counter shaft CS is coupled to the counter shaft CS by a third-shift clutch $C_3$, a third-shift stage is established.

If the main fourth-shift gear 6 relatively rotatably carried on the main shaft MS is coupled to the main shaft MS by a fourth-shift reverse clutch $C_{4R}$ in a condition in which the counter fourth-shift gear 11 relatively rotatably carried on the counter shaft CS has been coupled to the counter shaft CS by a selector gear SG, a fourth-shift stage is established. If the counter reverse gear 7 relatively rotatably carried on the main shaft MS is coupled to the main shaft MS by the fourth-shift reverse clutch $C_{4R}$ in a condition in which the counter reverse gear 12 relatively rotatably carried on the counter shaft CS has been coupled to the counter shaft CS by the selector gear SG, a backward-shift stage is established.

The rotation of the counter shaft CS is transmitted through a final drive gear 14 and a final driven gear 15 to a differential D and then transmitted therefrom through left and right axles 16, 16 to driving wheels W, W.

An electronic control unit U includes a CPU 17, a ROM 18, a RAM 19, an input circuit 20 and an output circuit 21.

Inputted to the input circuit 20 of the electronic control unit U are a throttle opening degree TH detected by a throttle opening degree sensor $S_1$ mounted on the engine E, a main shaft revolution-number $N_{MS}$ detected by a main shaft revolution-number sensor $S_2$ mounted on the main shaft MS, a counter shaft revolution-number $N_{CS}$ detected by a counter shaft revolution-number sensor $S_3$ mounted on the counter shaft CS, a vehicle speed V detected by a vehicle speed sensor $S_4$ mounted on the differential D, and a shift selecting lever position S detected by a shift selecting lever position sensor $S_5$.

The output circuit 21 of the electronic control unit U is connected to the shift solenoids $SL_1$ and $SL_2$, lock-up clutch solenoids $SL_3$ and $SL_4$ and a shifting clutch hydraulic pressure solenoid $SL_5$ provided in a hydraulic pressure control circuit O, in order to control the operation of the first-shift clutch $C_1$, the second-shift clutch $C_2$, the third-shift clutch $C_3$, the fourth-shift reverse clutch $C_{4R}$, the selector gear SG and the lock-up clutch L of the automatic transmission T.

The operation of the embodiment of the present invention having the above-described arrangement will be described below.

Figure 2:
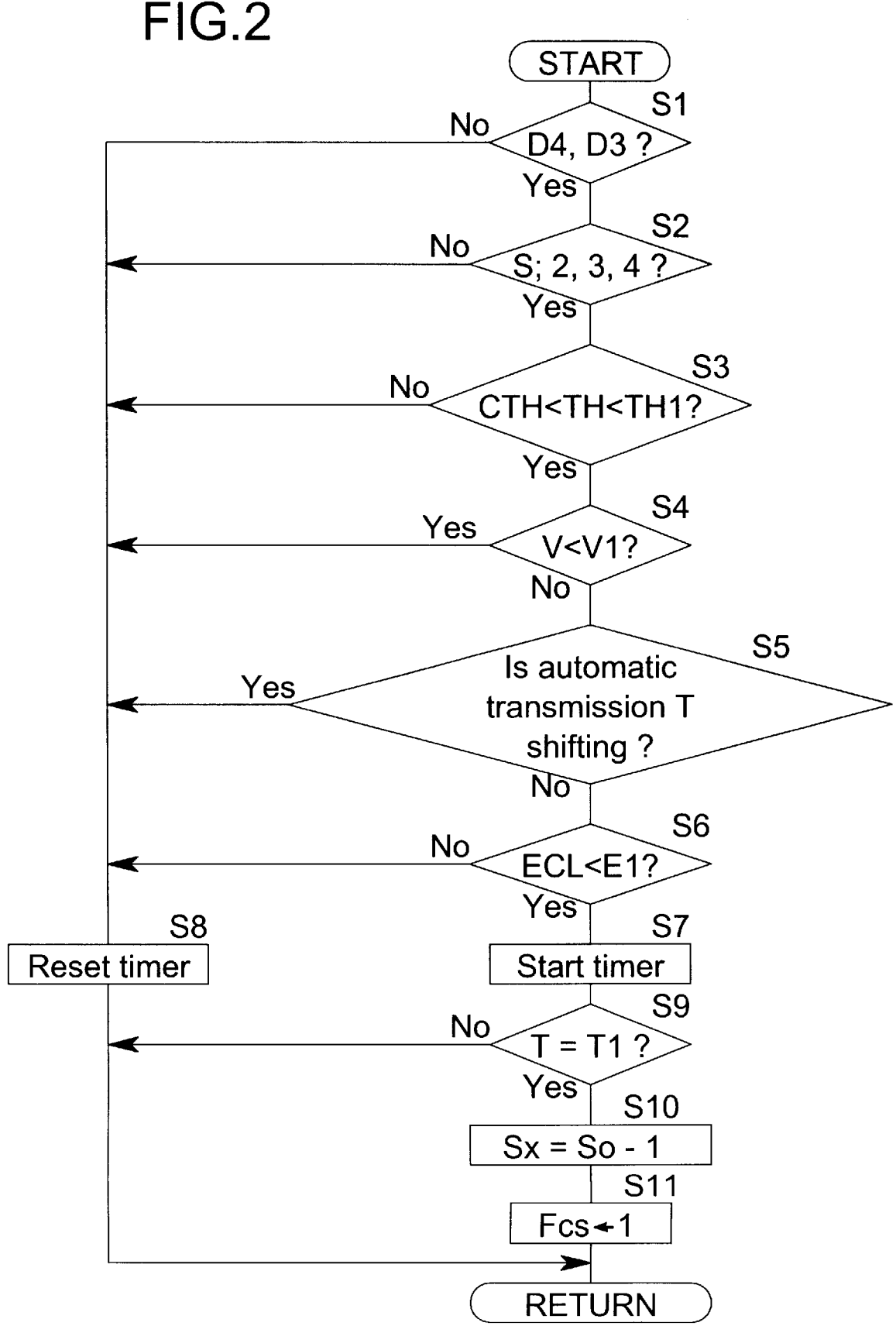
FIG. 2 is a flow chart of the operation of the preferred embodiment of the present invention.

A timer is started at Step S7 if all of the following conditions (1) to (6) are established: (1) the position of a shift selecting lever of the automatic transmission T is in a "D4" range or a "D3" range which are automatic shifting ranges, at Step S1 of a flow chart in FIG. 2; (2) the currently established shift stage is a second shift stage, a third shift stage or a fourth shift stage, at Step S2; (3) a throttle opening degree TH detected by the throttle opening degree sensor $S_1$, is between a fully-closed opening degree CTH and a control region opening degree TH1, at Step S3; (4) a vehicle speed V detected by the vehicle speed sensor $S_4$, is not less than a reference vehicle speed $V_1$, at Step S4; (5) the automatic transmission T is not shifting, at Step S5; and (6) a clutch slip rate ECL is smaller than a reference slip rate E1 at Step S6. If any of the conditions at Steps S1 to S6 is not established, the timer is reset at Step S8.

The determination of clutch slip at Step S6 is carried out for any of the four clutches $C_1$, $C_2$, $C_3$ and $C_4$ which is in an engaged state. Specifically, such determination is carried out in the following manner. A clutch slip rate ECL is calculated according to an equation of:

$$ECL = (N_{CS}/N_{MS}) \times R$$

from the main shaft revolution-number $N_{MS}$ detected by the main shaft revolution-number sensor $S_2$, the counter shaft revolution-number $N_{CS}$ detected by the counter shaft revolution-number sensors $S_3$ and a gear ratio R of the shift stage currently established. When the clutch does not slip, the value of the clutch slip rate ECL is 1. When the clutch slips, resulting in an increased number $N_{MS}$ of revolutions of the main shaft, the value of the clutch slip rate ECL becomes less than 1. If the clutch slip rate ECL becomes less than the reference slip rate E1 by comparing the clutch slip rate ECL with the reference slip rate $E_1$ ($E_1 < 1$), it is determined that the clutch has been brought into a slipping state.

If the count time T of the timer reaches a reference time Ti at Step S9 after the clutch begins to slip, the shift stage Sx is shifted down to a shift stage lower by one stage than a current shift stage $S_0$ at Step S10, and a control flag $F_{CS}$ indicating the fact that a slip-avoiding control is being carried out, is set at "1" at Step S11. Therefore, if slipping is generated in the clutch during traveling of the vehicle at the fourth-shift stage, the fourth-shift stage is shifted down to the third-shift stage. If slipping is generated in the clutch during traveling of the vehicle at the second-shift stage, the second-shift stage is shifted down to the first-shift stage.

The substantial capacity (transmittable torque) of the clutch for a lower-shift stage used at higher engine output during starting or accelerating of the vehicle is set at a larger value. Therefore, if the shift stage is shifted down to a lower shift stage when the clutch is slipping, the slipping of the clutch can be prevented and reduced. Even when there is no difference between the substantial capacity of the clutch before shifting and the substantial capacity of the clutch after shifting, the relationship between the throttle opening degree TH and the vehicle speed V is varied by the shift change, and the clutch operation can move out of a slip-generating zone.

This operation will be described more specifically with reference to FIG. 4. If slipping is generated in the clutch in a fourth-shift slipping zone in which there is a possibility of generation of slipping at the fourth-shift stage in a shift map made by taking the vehicle speed V on the axis of abscissas and the throttle opening degree on the axis of ordinates, the fourth-shift stage is shifted down to the third-shift stage irrespective of a shifting line in the shift map. As a result, although the slipping of the clutch cannot be completely prevented, the downshifting causes the throttle opening degree TH to be varied at a given vehicle speed V, and the vehicle speed V to be varied at a given throttle opening degree TH. Therefore, the clutch can be substantially removed from the slip generating zone.

When the slipping is still generated in a third-shift slipping zone even if the fourth-shift stage is shifted down to the third-shift stage, the third-shift stage is shifted down to the second-shift stage irrespective of the shifting line in the shift map and as a result, the slipping of the clutch is completely prevented.

When the slip-avoiding control is not carried out and the control flag $F_{CS}$ is reset at "0" (i.e., the vehicle is in a usual traveling state) at Step S21 in the flow chart in FIG. 3, down-shifting is carried out based on a usual shift map using the vehicle speed V and the throttle opening degree TH as parameters at Step S22. On the other hand, when the slip-avoiding control is being carried out and the control flag $F_{CS}$ is set at "1" at Step S21, the shift stage is fixed at a shift stage provided after down-shifting at Step S23.

At Step S24, the shift stage Sx provided after the down-shifting is maintained until it corresponds with a shift stage $S_{MAP}$ searched from the usual shift map. When the shift stage Sx then corresponds with the shift stage $S_{MAP}$ at Step S24, the control flag $F_{CS}$ is reset at "0" at Step S25. As a result, the slip-avoiding control is finished, returning to a shift control based on the usual shift map.

In the embodiment described above, the shift stage is shifted down to a lower shift stage when slipping is generated in the clutch. However, when the capacity of the clutch for the higher shift stage is larger than that of the clutch for the lower shift stage, the shift stage can be shifted up to a higher shift stage. In addition, the hydraulically engaged element of the automatic transmission in the embodiment is not limited to the clutch, and may be a brake.

When slipping is generated in the hydraulically engaged element selected in accordance with the operational state of the vehicle, a hydraulically engaged element larger in driving-force transmitting capacity than the hydraulically engaged element, is determined and brought into its engage state. Therefore, it is possible to prevent the slipping of the hydraulically engaged element without increasing of the hydraulic pressure.

The determining means determines the hydraulically engaged element for establishing a shift stage lower than the shift stage established by the hydraulically engaged element which is in its engaged state. Therefore, it is possible to further reliably prevent the slipping.

When the hydraulically engaged element selected based on the operational state of the vehicle, corresponds with the hydraulically engaged element determined by the determining means, the former hydraulically engaged element is brought into its engaged state, in place of the latter hydraulically engaged element. Therefore, the shift control conducted upon the generation of slipping can be restored to shift control conducted in the usual condition.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A control system for an automatic transmission for a vehicle, for performing shifting by selectively bringing any of a plurality of hydraulically engaged elements into an engaged state, based upon an operational state of the vehicle, said control system comprising:

a slip detecting means for detecting slipping of a selected hydraulically engaged element during a non-shifting state of the automatic transmission;

a determining means for determining one of said hydraulically engaged elements which has a driving force transmitting capacity larger than the driving force transmitting capacity of said selected hydraulically engaged element, for establishing a shift stage which is always lower than the shift stage established by said selected hydraulically engaged element in which slipping is detected; and a switching means for switching said selected hydraulically engaged element to the hydraulically engaged element determined by said determining means, to bring the determined hydraulically engaged element into its engaged state, when slipping is detected in said selected hydraulically engaged element by said slip detecting means.

2. A control system for an automatic transmission for a vehicle, for performing shifting by selectively bringing any of a plurality of hydraulically engaged elements into an engaged state, based upon an operational state of the vehicle, said control system comprising:

a slip detecting means for detecting slipping of a selected hydraulically engaged element during a non-shifting state of the automatic transmission;

a determining means for determining one of said hydraulically engaged elements which has a driving force transmitting capacity larger than the driving force transmitting capacity of said selected hydraulically engaged element; and a switching means for switching said selected hydraulically engaged element to the hydraulically engaged element determined by said determining means, to bring the determined hydraulically engaged element into its engaged state, when slipping is detected by said slip detecting means, wherein when the hydraulically engaged element selected based upon the operational state of the vehicle corresponds with the hydraulically engaged element determined by said determining means, said switching means switches the hydraulically engaged element selected based upon the operational state of the vehicle into its engaged state.

* * * * *

UNITED STATES PATENT AND TRADEMARK OFFICE
CERTIFICATE OF CORRECTION

PATENT NO. : 5,827,152

DATED : October 27, 1998

INVENTOR(S) : Sato et al.

It is certified that error appears in the above-identified patent and that said Letters Patent is hereby corrected as shown below:

On the title page, and column 1,
    Item [54], line 1, delete "AUTOMTIC" insert therefor

-- AUTOMATIC --

Signed and Sealed this

Second Day of February, 1999

Attest:

Attesting Officer

*Acting Commissioner of Patents and Trademarks*